(12) United States Patent
Schmidt

(10) Patent No.: US 10,349,621 B2
(45) Date of Patent: Jul. 16, 2019

(54) METHOD AND DEVICE FOR APPLYING INGREDIENTS IN FOOD PRODUCTION

(75) Inventor: Sebastian Schmidt, Lindau (DE)

(73) Assignee: Hochland SE, Heimenkirch (DE)

( * ) Notice: Subject to any disclaimer, the term of this patent is extended or adjusted under 35 U.S.C. 154(b) by 326 days.

(21) Appl. No.: 13/818,951

(22) PCT Filed: Jul. 19, 2011

(86) PCT No.: PCT/EP2011/062292
§ 371 (c)(1),
(2), (4) Date: Feb. 25, 2013

(87) PCT Pub. No.: WO2012/025307
PCT Pub. Date: Mar. 1, 2012

(65) Prior Publication Data
US 2013/0156919 A1  Jun. 20, 2013

(30) Foreign Application Priority Data
Aug. 25, 2010  (DE) .................. 10 2010 035 521

(51) Int. Cl.
| A01J 25/15 | (2006.01) |
| A01J 25/12 | (2006.01) |
| A01J 27/02 | (2006.01) |
| A23C 19/082 | (2006.01) |
| A23P 20/12 | (2016.01) |

(52) U.S. Cl.
CPC .............. *A01J 25/15* (2013.01); *A01J 25/12* (2013.01); *A01J 27/02* (2013.01); *A23C 19/082* (2013.01); *A23P 20/12* (2016.08)

(58) Field of Classification Search
CPC . A01J 25/12; A01J 25/15; A01J 27/02; A23C 19/082; A23L 1/005; A23P 1/082
See application file for complete search history.

(56) References Cited

U.S. PATENT DOCUMENTS

| 4,626,439 A | 12/1986 | Meyer |
| 5,000,086 A | 3/1991 | Bartling |
| 5,256,432 A * | 10/1993 | McDonald et al. .......... 426/275 |

(Continued)

FOREIGN PATENT DOCUMENTS

| DE | 836138 C | 4/1952 |
| DE | 10205824 A1 | 8/2003 |
| WO | 2006073598 A1 | 7/2006 |

*Primary Examiner* — Michele L Jacobson
*Assistant Examiner* — Preston Smith
(74) *Attorney, Agent, or Firm* — Robert Lelkes

(57) ABSTRACT

A method and device for introducing a visible ingredient 7, 12 into the surface of a food present as a flowable mass, in particular a hot processed cheese 1,
wherein the flowable mass of the food without the ingredient added is fed into the roller gap between a guide roller 2 and a calibration roller 3 disposed parallel thereto, and is shaped into a food strip having a defined thickness,
wherein the food strip is sprinkled on one side with the ingredient 7 by way of a sprinkling device 5 downstream of the roller gap while lying on the guide roller 2,
wherein the food strip 4, which has been sprinkled on one side, is fed to a further roller gap, which is formed between the guide roller 2 and a pressure roller 8,
wherein the ingredient 7 is pressed into the surface via the pressure roller 8 and
wherein the food strip is cut into individual slices, in particular after cooling.

19 Claims, 1 Drawing Sheet

(56) References Cited

U.S. PATENT DOCUMENTS

| | | |
|---|---|---|
| 6,117,235 A | 9/2000 | Toccaceli et al. |
| 6,579,550 B1 | 6/2003 | Baur |
| 2006/0127544 A1* | 6/2006 | Shibauchi et al. ............ 426/274 |
| 2006/0147585 A1* | 7/2006 | Winckelmann ...... A23G 3/0085 426/96 |
| 2007/0098861 A1 | 5/2007 | Biggel |
| 2013/0122169 A1 | 5/2013 | Biggel et al. |

\* cited by examiner

METHOD AND DEVICE FOR APPLYING INGREDIENTS IN FOOD PRODUCTION

CROSS-REFERENCE TO RELATED APPLICATIONS

This application is a national phase application of international application no. PCT/EP2011/062292 filed on Jul. 19, 2011, under 35 USC § 371, which claims priority under the Paris Convention from German patent application no. 10 2010 035 521.6 filed on Aug. 25, 2010.

TECHNICAL FIELD

The present invention relates to a method for introducing a visible ingredient into the surface of a food present as a flowable mass, in particular a hot processed cheese.

BACKGROUND OF THE INVENTION

It has long been known from the field of food production to mix ingredients into the raw mass of the food before the raw mass is fed to the further processing. Such a procedure is generally customary in sausage or cheese production, for example. Seasoning is often utilized in this manner, as are visible ingredients, such as herbal leaves or mushroom slices, the purpose of which is mainly to improve the visual appearance and, therefore, the attractiveness of the food.

In the case of processed cheese it is known to also mix ingredients of that type into the processed cheese, which is then cooled in shaping containers to form blocks and is finally cut into slices. Since all the ingredients, including the herbal leaves and/or mushroom slices, were embedded within the processed cheese in random orientations, cutting reveals a cross section having an indiscriminate and rather unattractive appearance, and in which the special nature of the ingredients is barely noticeable. A further disadvantage of this method is that it is complex and therefore unsuitable for the large-scale production of cheese slices.

The same applies for the surface of processed cheese slices that are produced by mixing the ingredients directly into the processed cheese, which is then rolled out to form slices. In this case the ingredients are usually completely enclosed within the processed cheese and therefore only a small portion thereof appears at the surface, and in a random orientation.

Both methods therefore have the great disadvantage that the quantity of ingredients to be added is too small relative to the quantity of ingredients that is ultimately visible at the surface. The amount used and the production costs are therefore too high, which is hardly justifiable in the cases in particular in which the ingredients are intended merely for enhancing the appearance of the product and hardly affect the flavor.

The problem addressed by the present invention is therefore that of providing a method for introducing a visible ingredient into the surface of a food present as a flowable mass, in particular a hot processed cheese, which is easy to implement and permits the mass production of visually appealing slices of this food, in which the ingredients are still recognizable as such. A further problem addressed by the invention is that of creating a simple device that implements the method.

SUMMARY OF THE INVENTION

These Problems are Solved by
(1) a method for introducing a visible ingredient into the surface of a food present as a flowable mass, in particular a hot processed cheese, wherein the flowable mass of the food without the ingredient added is fed into the roller gap between a guide roller and a calibration roller disposed parallel thereto, and is shaped into a food strip having a defined thickness, wherein the food strip is sprinkled on one side with the ingredient by way of a sprinkling device downstream of the roller gap while lying on the guide roller, wherein the food strip, which has been sprinkled on one side, is fed to a further roller gap, which is formed between the guide roller and a pressure roller, wherein the ingredient is pressed into the surface via the pressure roller and wherein the food strip is cut into individual slices, in particular after cooling, and
(2) a device for introducing an ingredient into the surface of a food present as a flowable mass, in particular for implementing the method according to the present invention, wherein a roller pair formed of a guide roller and a calibration roller having a smaller diameter, wherein the calibration roller is disposed above the guide roller, wherein a sprinkling device dispensing the ingredient is equipped with a sprinkling outlet disposed next to the calibration roller, the sprinkling outlet leading onto the upper quadrant of the guide roller.

BRIEF DESCRIPTION OF THE DRAWINGS

A special embodiment of the invention is shown in FIGS. 1 and 2.

DETAILED DESCRIPTION OF THE INVENTION

Figure 1:
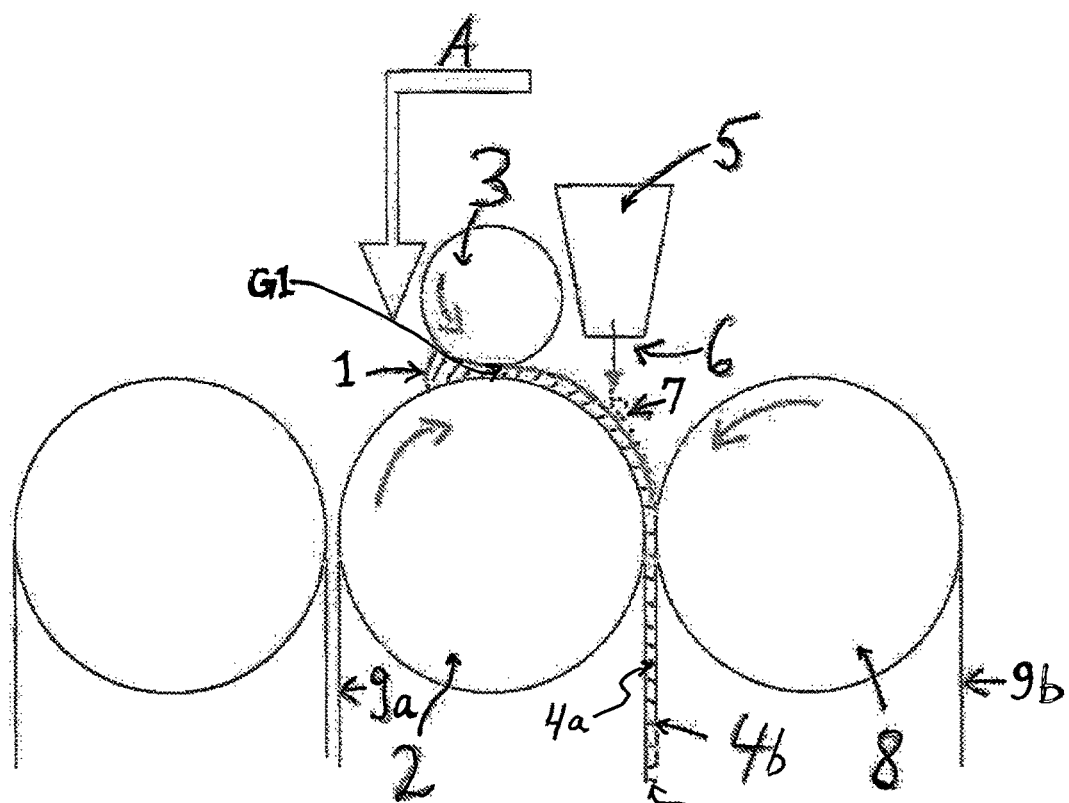
FIG. 1 shows a device for application on one side and
FIG. 2 shows a device for application on two sides.

The gist of the invention is to first shape the flowable food mass, in particular the hot processed cheese, in a roller gap, forming a food strip, then sprinkle the ingredient or ingredients onto the surface of this strip on one side or both sides, basically adhere the ingredients in the mass using a pressure roller and then further process the food strip with the ingredient added. The method according to the invention is suited primarily for foods that are initially processed in the hot state with low viscosity and are then cooled in the further course of processing, thereby becoming a sliceable product. The procedure according to the invention is suitable primarily for the large-scale production of processed cheese slices with visible ingredients added.

In a preferred embodiment, the flowable mass, in particular the processed cheese, has an elevated processing temperature and in that the surfaces of the food strip is cooled relative to the initial processing temperature by lying on the calibration roller and the guide roller, wherein the ingredient is applied onto the thusly cooled surface. The surfaces of the processed cheese are preferably cooled to a temperature slightly below the processing temperature, wherein the viscosity of the processed cheese therefore increases only slightly.

Within the scope of production, according to the invention, the flowable mass of the food, to which ingredients have initially not been added, that is, the processed cheese in particular that has been heated to a temperature above 80° C., is introduced into the roller gap formed by a guide roller and a calibration roller and, upon passage through the roller gap, is shaped into a food strip or a wide cheese strip having a defined thickness. The surface of the food or cheese strip is sprinkled on one side with the ingredient or ingredients downstream of the roller gap but while still lying on the guide roller, wherein a sprinkling device is used for the sprinkling that permits uniform sprinkling of the entire surface. In this type of sprinkling, which is suitable for any scatterable ingredients having the most diverse shapes, the flat, leaf-like ingredients, in fact, come to lie flat on the surface. The food strip is initially sprinkled on one side using the process described. This first sprinkling on one side can be followed by a second such sprinkling on the other side, thereby resulting in a food strip sprinkled on both sides.

The food strip, which has been initially sprinkled on one side in this manner, is then immediately fed to a further roller gap formed between the guide roller on which the food strip still lies and a pressure roller. The ingredient is pressed slightly into the surface by way of the pressure roller using adjustable pressure in particular, wherein the pressing-in advantageously takes place such that the slice thickness is not changed, at least not substantially so. The food or cheese strip is then fed to the further processing.

The further processing of the food strip, which has initially been sprinkled on one side, can be a further "sprinkling on one side" according to the invention on the other side of the food strip, thereby resulting in a food strip which has been sprinkled on both sides. Such a sprinkling on two sides is shown in one of the exemplary embodiments described in the following.

After the sprinkling on one side or two sides, the food strip can be fed to cooling before this is finally cut initially in parallel strips and then into individual slices. Such shaping, cooling and cutting of a cheese strip is described in DE 10 328 905 A1. In this manner, finally-sprinkled cheese slices are produced in a single pass.

According to the invention, various ingredients such as herbs, mushroom slices or seasoning can be added via sprinkling, wherein the advantage of the method becomes apparent in particular when the ingredients are flat or leaf-like and are sprinkled in a correspondingly flat manner onto the surface, as described above. Such ingredients create an attractive surface appearance since they are easily seen in their typical form and are therefore identifiable by the customer. The method according to the invention also makes it possible to apply a different ingredient to either side of the food strip, thereby making it possible to produce a food product that is particularly attractive to the customer.

A further particular advantage of the procedure according to the invention relates to the relatively low production costs compared to the known technologies. This is due not only to the reduction in production steps, but also primarily to the reduced usage of ingredients. Finally, it is no longer necessary to infuse the entire product with ingredients when the intention is merely for these to be visible only on the surface.

Given that the sprinkled material is present only on the surface of the cheese strip and the subsequent single slice, the product, in particular the processed cheese slice, has high inherent stability during further processing and ultimate consumption. Specifically in the case of cheese slices to be consumed individually, which are manually removed from a stack and are placed on a cheeseburger, for example, this high inherent stability is an indispensable advantage.

As described above, the use of the invention has proven particularly advantageous when the flowable mass, which is a processed cheese in particular, initially has an elevated processing temperature and low viscosity before the surfaces of the food strip are cooled slightly relative to the initial processing temperature by lying on the calibration roller and the guide roller before the ingredient is applied onto the slightly cooled surface. It can suffice to cool the surfaces of the processed cheese to a temperature that is slightly below the processing temperature, which is between 80° C. and 90° C., thereby ensuring that the viscosity of the processed cheese increases only slightly.

For instance, it has been shown in attempts to produce such sprinkled cheese slices that the ingredients, as the sprinkled material, must be sprinkled onto a sticky cheese surface, wherein the optimal consistency of the processed cheese should be found on the surface. Finally, the processed cheese must not be so fluid that the ingredients sink into the mass. At the same time, the surface must still be soft enough that the ingredients can become embedded therein. A highly substantial advantage of the method according to the invention is that this optimal consistency on the product surface can be set via the cooling and via the placement of the sprinkling device with respect to the rollers. The ingredients can therefore be applied via sprinkling exactly where the temperature and surface consistency are optimal in the case of the cheese mass that is about to be processed.

In addition, by controlling the temperature of the calibration roller and/or the preshaping roller, which is located upstream thereof in the case of the sprinkle-application on both sides and functions simultaneously as a calibration roller, it is ensured that the product detaches from the particular roller without leaving residue thereon.

FIG. 1 schematically shows a device for the single-sided introduction of an ingredient into the surface of a food present as a flowable mass, in particular a processed cheese 1 having a temperature between 80° C. and 90° C., the flowable mass being fed to the device via a conduit system (depicted schematically by the arrow A) of a first roller pair. The roller pair is formed by a guide roller 2 and a calibration roller 3, wherein the calibration roller 3 has a smaller diameter than the guide roller 2 and is disposed above the guide roller 2. This arrangement has the advantage, inter alia, that gravity is utilized to guide the cheese strip, which therefore has less of a tendency to adhere to the calibration roller 3.

The surface of the calibration roller 3 has a non-stick coating, in particular made of Teflon, and is cooled to a surface temperature of approximately 40° C. in order to further reduce the risk of adhesions. The cheese strip 4 is rolled out to a defined thickness in the roller gap between the guide roller 2 and the calibration roller 3, wherein, advantageously, the width of the roller gap is adjustable.

Furthermore, a sprinkling device 5 filled with an ingredient is equipped with a sprinkling outlet 6 disposed directly next to the calibration roller 3. In this example, the sprinkling device 5 can be embodied as a roller-feed distributor. It is also possible to use vibrating distributors, linear distributors, belt distributors, brush distributors or the like. The ingredient 7 drops from the sprinkling outlet 6 directly onto the upper quadrant of the guide roller 2 and sticks to the slightly cooled processed cheese. Particularly good adhesion without the possibility of the ingredient sliding off is achieved in this manner.

Disposed next to the guide roller 2 is a pressure roller 8 having the same diameter, wherein the guide roller 2 and the pressure roller 8 each guide an endless cooling belt 9a, 9b. Neither of the lower counter rollers is shown. The cheese strip 4 with the ingredient added is conveyed downward accordingly between the two cooling belts 9a, 9b, which rotate in the arrow direction, wherein the cheese strip cools.

The cooling belts 9a, 9b are arranged vertically, thereby saving space and ensuring highly efficient cooling. Since the product in the liquid state is supported on both sides by the two adjacent cooling belts and therefore does not flow off or change shape, it is possible, due also to the viscosity thereof, to easily and conveniently process products that are difficult to handle. The roller gap between the guide roller 2 and the pressure roller 8, the width of which can be adjusted, can be used to smooth the product surface and press in the ingredients.

Figure 2:
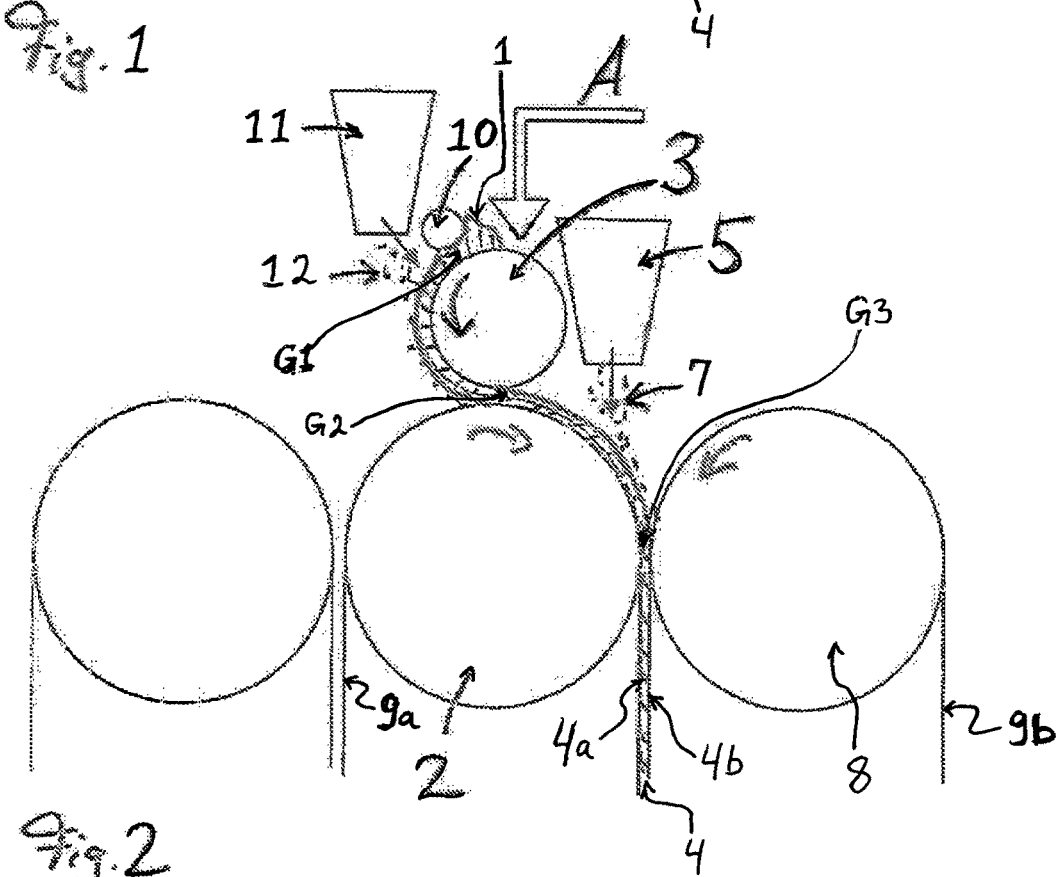

The embodiment according to FIG. 2 corresponds, in principle, to that shown in FIG. 1, with the exception that the sprinkling on one side shown in FIG. 1 is preceded by a first single-sided sprinkling on the other side. A preshaping roller 10, which is also coated with Teflon, now calibrates the cheese strip. The calibration roller 3 now functions as the guide roller for the first single-sided sprinkling. In contrast, the guide roller 2 now functions as a pressure roller for the ingredient sprinkled onto the first side (4*a*).

A second sprinkling device 11, which is also filled with an ingredient 12, is also provided, wherein this ingredient 12 need not correspond to the ingredient 7. The processed cheese is again fed according to the arrow A to the roller gap between the calibration roller 3 and the preshaping roller 10, wherein—as shown—in this exemplary embodiment, the calibration roller 3 functions as a guide roller to the extent that the cheese strip shaped in the first roller gap does not adhere thereto nor to the preshaping roller 10. The sprinkling outlet of the sprinkling device 11 leads, directly next to the preshaping roller 10, onto the upper quadrant of the calibration roller 3. The processed cheese, which is initially sprinkled on one side with the ingredient 12 and is rolled out to form a strip, is now guided into the further roller gap between the calibration roller 3 and the guide roller 2, which does not perform further shaping of the cheese strip in this case. In this second stage, the cheese strip is sprinkled with the ingredient 7 on the other surface (4*b*) in accordance with the exemplary embodiment according to FIG. 1.

In both cases it is advantageous when the position of the sprinkling outlet of the sprinkling devices 5 and/or 11 is adjustable relative to the calibration roller 3 and/or the preshaping roller 10. Each of the sprinkling devices has a sprinkling outlet, which covers the width of the food strip. The respective sprinkling device (5, 11) is preferably a sprinkler having an adjustable sprinkling quantity.

The calibration roller (3) and the preshaping roller (10) are preferably temperature-controlled, and preferably comprise a roller surface having a non-stick coating. The temperature of the calibration roller (3) and/or the preshaping roller (10) is preferably adjustable.

In the figures it is not shown that the endless cooling belts 9*a*, 9*b* extend further downward, where they release the cheese strip having a final temperature between approximately 5° C. and 15° C. for further processing. The further processing initially comprises longitudinal cutting of the wide strip into parallel strips, which are then cut transversely in a further cut to form individual slices, as disclosed in DE 10 328 905 A1.

The invention claimed is:

1. A method for introducing an ingredient (7) into the surface of cheese (1) present as a flowable mass comprising:
   (a) feeding a flowable mass of cheese (1) into a first roller gap (G1) between a first cooling belt (9*a*) having a temperature lower than the temperature of the flowable mass of cheese supported on a guide roller (2) and a calibration roller (3) disposed above and parallel to the guide roller (2) by counter-rotating the guide roller (2) and the calibration roller (3) for transporting the flowable mass of cheese (1) into the first roller gap (G1), whereby the flowable mass of cheese (1) is (a) cooled by contact with the first cooling belt (9*a*) and (b) shaped by the first roller gap (G1) into a strip (4) having (1) a defined thickness, (2) a first surface (4*a*) in contact with the first cooling belt (9*a*) and (3) a second surface (4*b*) on the side of the strip (4) opposite to the first surface (4*a*),
   (b) sprinkling an ingredient (7) onto the second surface (4*b*) of the strip (4) downstream from the first roller gap (G) while the first surface (4*a*) of the strip (4) is in contact with the first cooling belt (9*a*) while carrying out (a), and
   (c) feeding the strip (4) formed according to (a) which has been sprinkled with the ingredient (7) according to (b) into a second roller gap (G2) between the first cooling belt (9*a*) and a second cooling belt (9*b*) guided by a pressure roller (8) mounted parallel to the guide roller (2), by counter-rotating the pressure roller (8) relative to the guide roller (2), whereby the ingredient (7) is pressed into the second surface (4*b*) of the strip (4) while substantially maintaining the defined thickness of the strip (4) via the second roller gap (G2),
   wherein the strip (4) is supported between the first cooling belt (9*a*) and the second cooling belt (9*b*) while carrying out (c) and the ingredient (7) is a scatterable ingredient while carrying out (b), which becomes embedded in the second surface (4*b*) of the strip (4) while carrying out step (c).

2. A method for introducing one or more ingredients (7, 12) into the first and second surface (4*a*, 4*b*) of a cheese (1) present as a flowable mass comprising:
   (a) feeding a flowable mass of cheese (1) into a first roller gap (G1) between a calibration roller (3) having a temperature lower than the temperature of the flowable mass of cheese (1) and a pre-shaping roller (10) disposed parallel to the first calibration roller (3), by counter-rotating the calibration roller (3) and the pre-shaping roller (10) for transporting the flowable mass of cheese (1) into the first roller gap (G1), whereby the flowable mass of cheese (1) is (a) cooled by contact with the calibration roller (3) and (b) shaped by the first roller gap (G1) into a strip (4) having (1) a defined thickness, (2) a first surface (4*a*) in contact with the pre-shaping roller (10) and (3) a second surface (4*b*) on the side of the strip (4) opposite to the first surface (4*a*) in contact with the calibration roller (3),
   (b) sprinkling a first ingredient (12) onto the first surface (4*a*) of the strip (4) downstream from the first roller gap (G1) while the second surface (4*b*) of the strip (4) is in contact with the calibration roller (3) while carrying out (a),
   (c) feeding the strip (4) formed according to (a) and (b) into a second roller gap (G2) between the calibration roller (3) and a first cooling belt (9*a*) having a temperature lower than the temperature of the strip (4) guided by a guide roller (2) disposed parallel to the first calibration roller (3), by counter-rotating the guide roller (2) and the calibration roller (3) for transporting the strip (4) formed in (a) into the second roller gap (G2), whereby the strip (4) is cooled by contact with the first cooling belt (9*a*) and the ingredient (12) sprinkled onto the first surface (4*a*) of the strip (4) according to (b) is pressed into the first surface (4*a*) of the strip (4) while substantially maintaining the defined thickness of the strip (4) via the second roller gap (G2),
   (d) sprinkling a second ingredient (7) onto the second surface (4*b*) of the strip (4) downstream from the second roller gap (G2) while the first surface (4a) of the strip (4) is in contact with the first cooling belt (9a) while carrying out (c), and (e) feeding the strip (4) which has been sprinkled with the ingredient (7) on the first and second surfaces (4a, 4b) of the strip (4) into a third roller gap (G3) between the first cooling belt (9a) and a second cooling belt (9b) guided by a pressure roller (8) mounted parallel to the guide roller (2), by counter-rotating the pressure roller (8) relative to the guide roller (2), whereby the ingredient (7) applied to the second surface (4b) of the strip (4) is pressed into the second surface (4b) of the strip (4) via the third roller gap (G3), wherein the strip (4) is supported between the first cooling belt (9a) and the second cooling belt (9b) while carrying out (e), the first ingredient (12) and the second ingredient (7) may be the same or different, the first ingredient (12) is a scatterable ingredient while carrying out (b) which becomes embedded in the first surface (4a) of the strip (4) while carrying out (c) and the second ingredient (7) is a scatterable ingredient while carrying out (d) which becomes embedded in the second surface (4b) of the strip (4) while carrying out (e).

3. The method according to claim 1 further comprising:
(d) cutting the strip (4) formed according to (c) in parallel strips while carrying out (c) after the ingredient (7) is pressed into the second surface (4b) via the second roller gap (G2).

4. The method according to claim 3 further comprising:
(e) cutting the parallel strips formed according to (d) into individual slices.

5. The method according to claim 1, wherein the ingredient (7) is herbs and/or mushrooms and/or seasoning.

6. The method according to claim 3, wherein the ingredient (7) is herbs and/or mushrooms and/or seasoning.

7. The method according to claim 4 wherein the ingredient (7) is herbs and/or mushrooms and/or seasoning.

8. The method according to claim 1, wherein the cheese (1) is processed cheese and the temperature of the processed cheese in step (a) is in the range from 80° C. to 90° C.

9. The method according to claim 3, wherein the cheese (1) is processed cheese and the temperature of the processed cheese in step (a) is in the range from 80° C. to 90° C.

10. The method according to claim 2 further comprising:
(f) cutting the strip (4) formed according to (e) in parallel strips while carrying out (e) after the ingredient (7) is pressed into the second surface (4b) via the third roller gap (G3).

11. The method according to claim 10 further comprising:
(g) cutting the parallel strips formed according to (f) into individual slices.

12. The method according to claim 2, wherein at least one of the ingredients (7, 12) is herbs and/or mushrooms and/or seasoning.

13. The method according to claim 2, wherein each ingredient (7, 12) is herbs and/or mushrooms and/or seasoning.

14. The method according to claim 10, wherein at least one of the ingredients (7, 12) is herbs and/or mushrooms and/or seasoning.

15. The method according to claim 10, wherein each of the ingredients (7, 12) is herbs and/or mushrooms and/or seasoning.

16. The method according to claim 11, wherein at least one of the ingredients (7, 12) is herbs and/or mushrooms and/or seasoning.

17. The method according to claim 11, wherein each of the ingredients (7, 12) is herbs and/or mushrooms and/or seasoning.

18. The method according to claim 2, wherein the cheese (1) is processed cheese and the temperature of the processed cheese in step (a) is in the range from 80° C. to 90° C.

19. The method according to claim 10, wherein the cheese (1) is processed cheese and the temperature of the processed cheese in step (a) is in the range from 80° C. to 90° C.

* * * * *